US009626547B2

(12) United States Patent
Zhao

(10) Patent No.: US 9,626,547 B2
(45) Date of Patent: Apr. 18, 2017

(54) FINGERPRINT RECOGNITION DEVICE AND TOUCH APPARATUS

(71) Applicant: BOE TECHNOLOGY GROUP CO., LTD., Beijing (CN)

(72) Inventor: Jiayang Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/787,616

(22) PCT Filed: Apr. 14, 2015

(86) PCT No.: PCT/CN2015/076546
§ 371 (c)(1),
(2) Date: Oct. 28, 2015

(87) PCT Pub. No.: WO2016/115780
PCT Pub. Date: Jul. 28, 2016

(65) Prior Publication Data
US 2016/0210494 A1 Jul. 21, 2016

(30) Foreign Application Priority Data
Jan. 19, 2015 (CN) .......................... 2015 1 0025632

(51) Int. Cl.
G06K 9/00 (2006.01)
(52) U.S. Cl.
CPC ....... *G06K 9/0002* (2013.01); *G06K 9/00026* (2013.01)
(58) Field of Classification Search
CPC ........... G07C 9/00087; G07C 9/00158; G07C 2009/00095; G06F 21/32; G06Q 20/40145
(Continued)

(56) References Cited

U.S. PATENT DOCUMENTS

2009/0279745 A1* 11/2009 Liautaud ............ G06K 9/00026
382/116
2010/0098303 A1* 4/2010 Chen .................... G06K 9/0002
382/124
(Continued)

FOREIGN PATENT DOCUMENTS

| CN | 104063696 A | 9/2014 |
| CN | 104484663 A | 4/2015 |
| CN | 204347868 U | 5/2015 |

OTHER PUBLICATIONS

Search Report and Written Opinion Mailed on Jul. 30, 2015 from State Intellectual Property Office of the P.R. China.
Korean Office Action mailed Nov. 17, 2016.

*Primary Examiner* — Omer S Khan
(74) *Attorney, Agent, or Firm* — Dilworth & Barrese LLP.; Michael J. Musella

(57) ABSTRACT

A fingerprint recognition device and a touch apparatus comprise a plurality of fingerprint recognition areas (100) with a rectangle shape arranged in a matrix. Each of the fingerprint recognition areas (100) comprises a plurality of mutually independent fingerprint recognition electrodes (110) arranged along a diagonal direction of the fingerprint recognition area (100). Arrangement directions of the fingerprint recognition electrodes (110) in the respective fingerprint recognition areas (100) are same. Because the fingerprint recognition electrodes (110) in the respective fingerprint recognition areas (100) are arranged in a same diagonal direction, the fingerprint recognition electrodes (110) belonging to a same or adjacent fingerprint recognition area(s) (100) can detect full fingerprint information when a finger slides on the fingerprint recognition device in any one of a plurality of directions, so that the fingerprint is recognized. The sliding type fingerprint recognition device is not restricted by the sliding direction of the finger, and thus an (Continued)

application scope of the sliding type fingerprint recognition device can be expanded.

17 Claims, 12 Drawing Sheets

(58) Field of Classification Search
USPC .......................................................... 340/5.83
See application file for complete search history.

(56) References Cited

U.S. PATENT DOCUMENTS

| | | | |
|---|---|---|---|
| 2013/0076485 A1 | 3/2013 | Mullins | |
| 2013/0127744 A1* | 5/2013 | Shakya | G06F 3/044 345/173 |
| 2014/0320763 A1* | 10/2014 | Lee | G06F 3/044 349/12 |
| 2014/0333328 A1* | 11/2014 | Nelson | G06F 3/044 324/663 |
| 2015/0185906 A1* | 7/2015 | Park | G06F 3/0412 345/174 |
| 2016/0042215 A1* | 2/2016 | Wang | G06K 9/0002 382/124 |
| 2016/0306459 A1* | 10/2016 | Yang | G06F 3/044 |

* cited by examiner

FINGERPRINT RECOGNITION DEVICE AND TOUCH APPARATUS

TECHNICAL FIELD

The present disclosure relates to a field of display technique, and particularly to a fingerprint recognition device and a touch apparatus.

BACKGROUND

Currently the fingerprint recognition is generally applied to an electrical device as a means for login management. As illustrated in FIG. 1, in a fingerprint recognition apparatus, generally a fingerprint recognition pattern 03 is formed to be connected with a semiconductor chip 02 on a flexible circuit board 01, and detection signals are transmitted by the fingerprint recognition pattern 03 to the semiconductor chip 02 in order to recognize a fingerprint pattern. The fingerprint recognition can be classified as a pressing type and a sliding type according to their different recognition manners. Particularly, regarding the pressing type fingerprint recognition, as illustrated in FIG. 2, the fingerprint recognition pattern disposed on the flexible circuit board 01 comprises N×N electrodes, and a fingerprint is recognized when the flexible circuit board 01 is pressed by a human body. Regarding the sliding type fingerprint recognition, as illustrated in FIG. 3, the fingerprint recognition pattern disposed on the flexible circuit board 01 comprises 1×N electrodes, and a fingerprint is recognized as the finger slides in a direction denoted by an arrow shown in FIG. 3.

As compared with the pressing type fingerprint recognition apparatus, the sliding type fingerprint recognition apparatus may save space and is more suitable to be applied to the mobile device. However, the finger can slide only in a specific direction on the sliding type fingerprint recognition apparatus in application, and the fingerprint would not be recognized if the finger slides in other directions, therefore its application is limited for users.

SUMMARY

In view of this, in embodiments of the present disclosure, there is provided a fingerprint recognition device and a touch apparatus for settling a problem that a fingerprint can be detected by an existing sliding fingerprint recognition apparatus only if a finger slides in a specified manner.

Therefore, in the embodiments of the present disclosure, there is provided a fingerprint recognition device comprising a plurality of fingerprint recognition areas with a rectangle shape arranged in a matrix, each of the fingerprint recognition areas comprising a plurality of mutually independent fingerprint recognition electrodes arranged along a diagonal direction of the fingerprint recognition area; wherein the arrangement directions of the fingerprint recognition electrodes in the respective fingerprint recognition areas are same.

In a possible implementation, in the fingerprint recognition device according to the embodiments of the present disclosure, at least one row of the fingerprint recognition areas are controlled by a same data processing chip; or at least one column of the fingerprint recognition areas are controlled by a same data processing chip.

In a possible implementation, in the fingerprint recognition device according to the embodiments of the present disclosure, numbers of the fingerprint recognition electrodes in the respective fingerprint recognition areas are same.

In a possible implementation, in the fingerprint recognition device according to the embodiments of the present disclosure, the fingerprint recognition electrodes located at a same position in the respective fingerprint recognition areas being adjacent in a row direction are electrically connected with each other if the at least one row of the fingerprint recognition areas are controlled by the same data processing chip; and the fingerprint recognition electrodes located at a same position in the respective fingerprint recognition areas being adjacent in a column direction are electrically connected with each other if the at least one column of the fingerprint recognition areas are controlled by the same data processing chip.

In a possible implementation, in the fingerprint recognition device according to the embodiments of the present disclosure, in the fingerprint recognition areas arranged in the matrix, the fingerprint recognition electrodes in the respective fingerprint recognition areas being adjacent in a diagonal direction are arranged in a same line.

In a possible implementation, in the fingerprint recognition device according to the embodiments of the present disclosure, the fingerprint recognition electrodes included in each fingerprint recognition area are arranged in a direction at a 45° angle with respect to a frame of the fingerprint recognition area.

In a possible implementation, in the fingerprint recognition device according to the embodiments of the present disclosure, a distance between the fingerprint recognition electrodes located at a same position in per two adjacent fingerprint recognition areas is 5 mm~20 mm.

In a possible implementation, in the fingerprint recognition device according to the embodiments of the present disclosure, a distance between centers of adjacent fingerprint recognition electrodes in a same fingerprint recognition area is 42.3 μm to 84.7 μm.

In the embodiments of the present disclosure, there is further provided a touch apparatus comprising the fingerprint recognition device described above.

In a possible implementation, in the touch apparatus according to the embodiments of the present disclosure, a protective layer is further disposed on the fingerprint recognition device.

The fingerprint recognition device and the touch apparatus according to the embodiments of the present disclosure comprise a plurality of fingerprint recognition areas with the rectangle shape arranged in the matrix, each of the fingerprint recognition areas comprises the plurality of mutually independent fingerprint recognition electrodes arranged along the diagonal direction of the fingerprint recognition area, the arrangement directions of the fingerprint recognition electrodes in the respective fingerprint recognition areas are same. Because the fingerprint recognition electrodes are arranged in the same diagonal direction in the respective fingerprint recognition areas, the fingerprint recognition electrodes belonging to the same or adjacent fingerprint recognition areas can detect full fingerprint information when a finger slides on the fingerprint recognition device in any one of a plurality of directions, so that the fingerprint is recognized, thus the sliding type fingerprint recognition device is not restricted by the sliding direction of the finger, which extends an application scope of the sliding type fingerprint recognition device. Further, a full fingerprint can be detected without long distance sliding of the finger, and thus a sensitivity of the sliding type fingerprint recognition is increased. As compared with the pressing type fingerprint recognition device, the fingerprint recognition device according to the embodiments of the present disclosure can detect a full fingerprint image with less fingerprint recognition electrodes and is benefit for reduce of the cost.

BRIEF DESCRIPTION OF THE DRAWINGS

In order to explain solutions in the embodiments of the present disclosure or the prior art more clearly, accompanying drawings required for describing the embodiments of the present disclosure or the prior art will be introduced briefly below. Obviously, the accompanying drawings described below only some embodiments of the present disclosure, but those ordinary skilled in the art may obtain other drawings according to these accompanying drawings without any inventive labors.

DETAILED DESCRIPTION

Hereinafter, detailed implementations for the fingerprint recognition device and the touch apparatus according to the embodiments of the present disclosure would be described in detail in connection with the accompanying drawings.

Sizes or shapes of parts in the accompanying drawings are not intended to reflect actual scales, and only are exemplary for illustrating the principle of the present disclosure.

Figure 1:
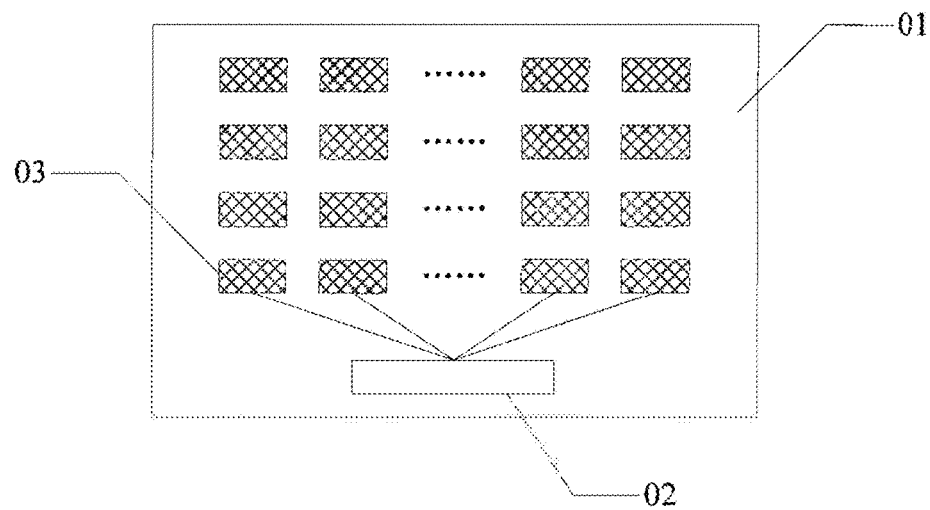
FIG. 1 is a schematic diagram illustrating a structure of a fingerprint recognition apparatus in the prior art.
Figure 2:
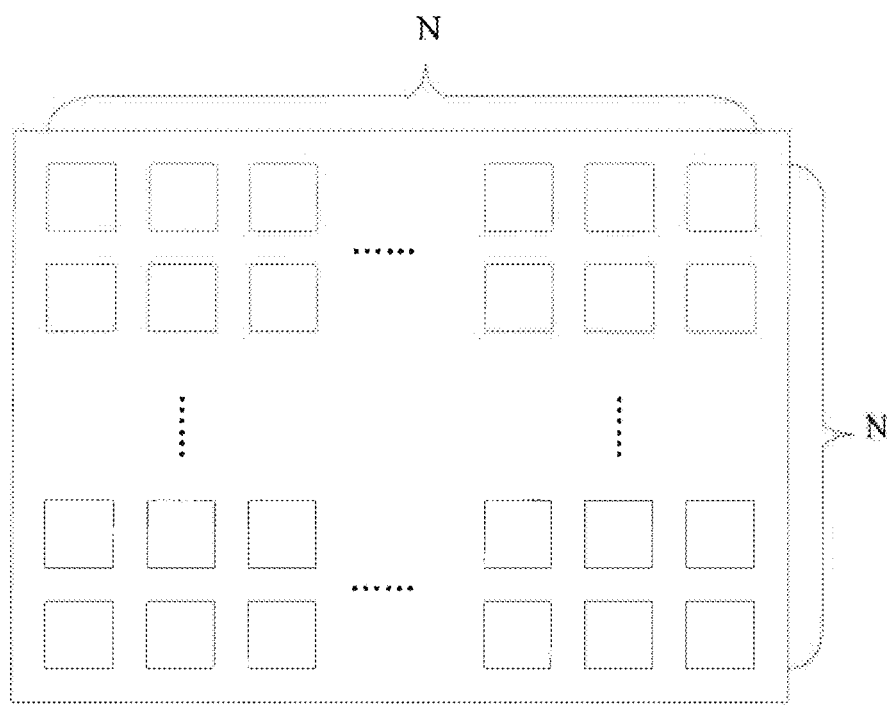
FIG. 2 is a schematic diagram illustrating a pressing type fingerprint recognition pattern in the prior art.
Figure 3:
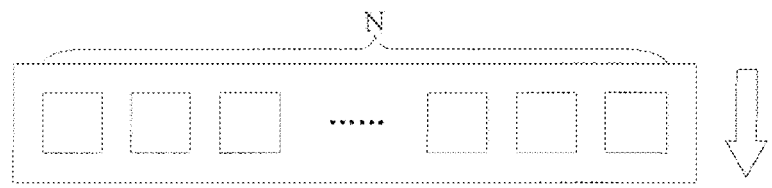
FIG. 3 is a schematic diagram illustrating a sliding type fingerprint recognition pattern in the prior art.
Figure 4A:
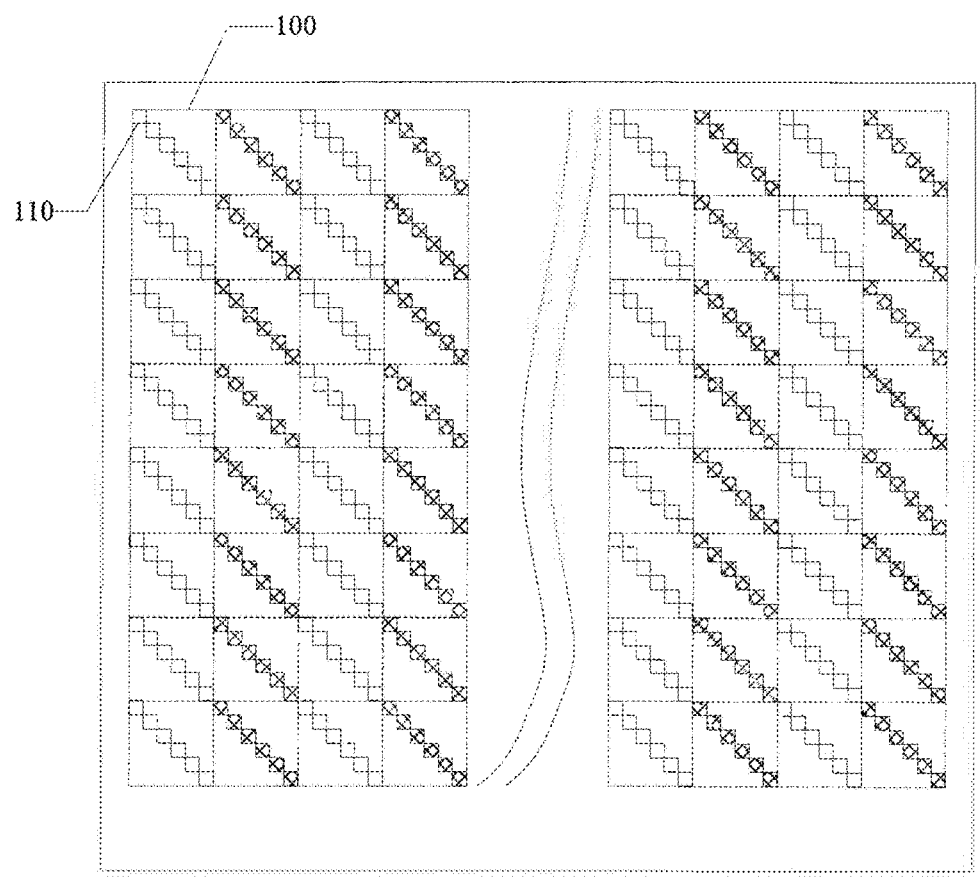
FIGS. 4a-4c are schematic diagrams illustrating structures of fingerprint recognition devices according to an embodiment of the present disclosure.

As illustrated in FIG. 4a, a fingerprint recognition device provided in the embodiments of the present disclosure comprises a plurality of fingerprint recognition areas 100 with a rectangle shape arranged in a matrix. In FIG. 4a, a fingerprint recognition device comprising 8×8 fingerprint recognition areas 100 with a shape of square is shown as an example.

Each of the fingerprint recognition areas 100 comprises a plurality of mutually independent fingerprint recognition electrodes 110 arranged along a diagonal direction of the fingerprint recognition area; and the arrangement directions of the fingerprint recognition electrodes 110 in the respective fingerprint recognition areas 100 are same.

More particular, in FIG. 4a, it is illustrated as an example that the respective fingerprint recognition electrodes 110 are arranged in a primary diagonal direction (namely a diagonal direction from upper-left to bottom-right) of the fingerprint recognition areas 100. Herein the mutually independent fingerprint recognition electrodes refer to that the respect fingerprint recognition electrodes in a same fingerprint recognition area are insulated with each other.

In a particular implementation, the actual shape of the respective fingerprint recognition electrodes 110 included in the fingerprint recognition device according to the embodiments of the present disclosure may also be any other suitable shape such as a diamond or a round, and is not limited to the rectangle as shown in FIG. 4a. Although in FIG. 4a the fingerprint recognition electrodes 110 are shown as being square, the fingerprint recognition areas 100 are also shown as being square and the respective fingerprint recognition electrodes 110 are arranged end to end in the primary diagonal direction of the fingerprint recognition electrodes 110, the detailed arrangement of the fingerprint recognition electrodes 110 may be designed differently in accordance with a rule that the fingerprint recognition electrodes 110 are arranged in a diagonal direction of the respective fingerprint recognition areas 100, depending on the actual shapes of the fingerprint recognition areas 100 and the fingerprint recognition electrodes 110, and no limitation is made here.

Generally, sizes of the fingerprint recognition areas divided in the fingerprint recognition device according to the embodiments of the present disclosure are same, and sizes of the fingerprint recognition electrodes 110 are also same.

In the fingerprint recognition device according to the embodiments of the present disclosure, because the fingerprint recognition electrodes 110 are arranged in the same diagonal direction in the respective fingerprint recognition areas 100, the fingerprint recognition electrodes 110 belonging to the same or adjacent fingerprint recognition areas 100 can detect full fingerprint information when a finger slides in any one of a plurality of directions, so that the fingerprint is recognized, thus the sliding type fingerprint recognition device is not restricted by the sliding direction of the finger, which extends an application scope of the sliding type fingerprint recognition device. Further, a full fingerprint can be detected without long distance sliding of the finger, and thus a sensitivity of the sliding type fingerprint recognition is increased. As compared with the pressing type fingerprint recognition device, the fingerprint recognition device according to the embodiments of the present disclosure can detect a full fingerprint image with less fingerprint recognition electrodes and is benefit for reduce of the cost.

As implemented actually, because images detected by the fingerprint recognition electrodes 110 in several fingerprint recognition areas 100 are usually required to be synthesized as a final fingerprint image when the fingerprint recognition device according to the embodiments of the present disclosure perform the fingerprint recognition, numbers of the fingerprint recognition electrodes 110 are generally configured to be same in the respective fingerprint recognition areas 100 in an actual design in order to ensure that resolutions of the images acquired by the respective fingerprint recognition areas 100 are identical substantively. In FIGS. 4a and 4c, it is illustrated as an example that each of the fingerprint recognition areas 100 comprises 6 fingerprint recognition electrodes 110, that is, each of the fingerprint recognition areas 100 is composed of 6 fingerprint recognition electrodes 110.

Figure 4B:
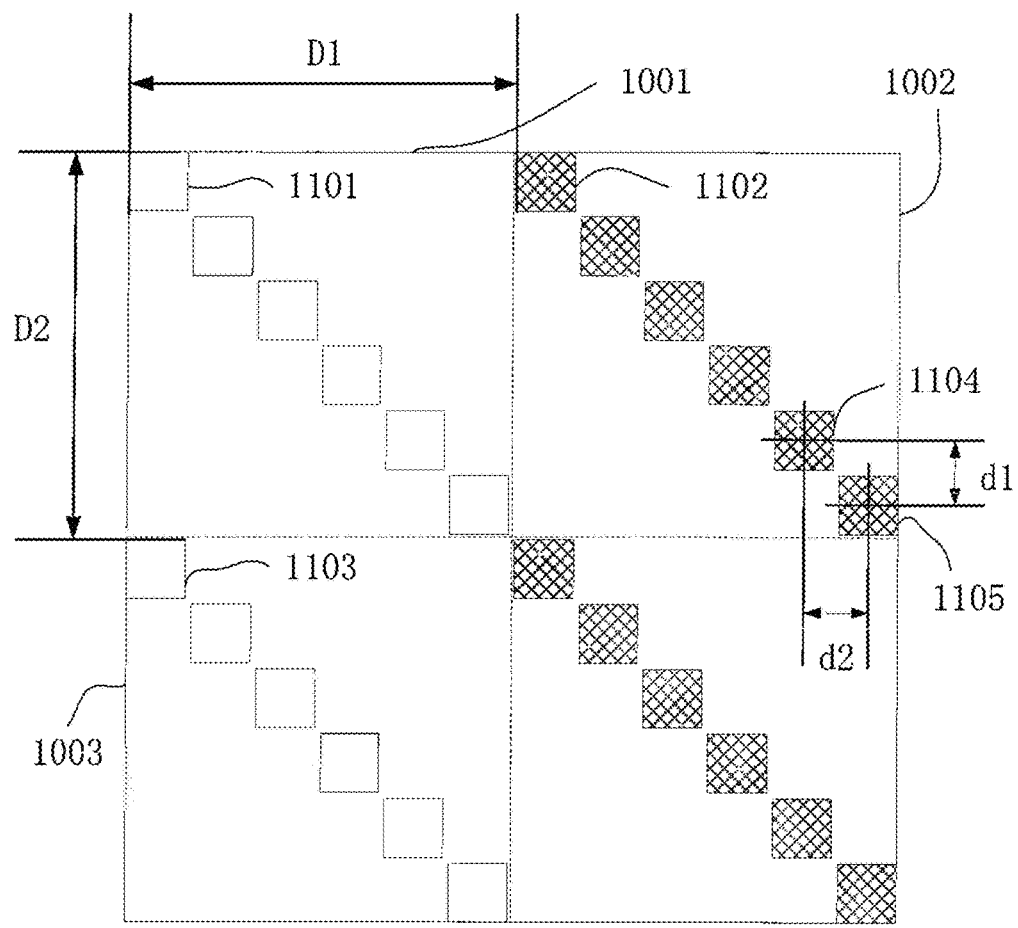
Figure 4C:
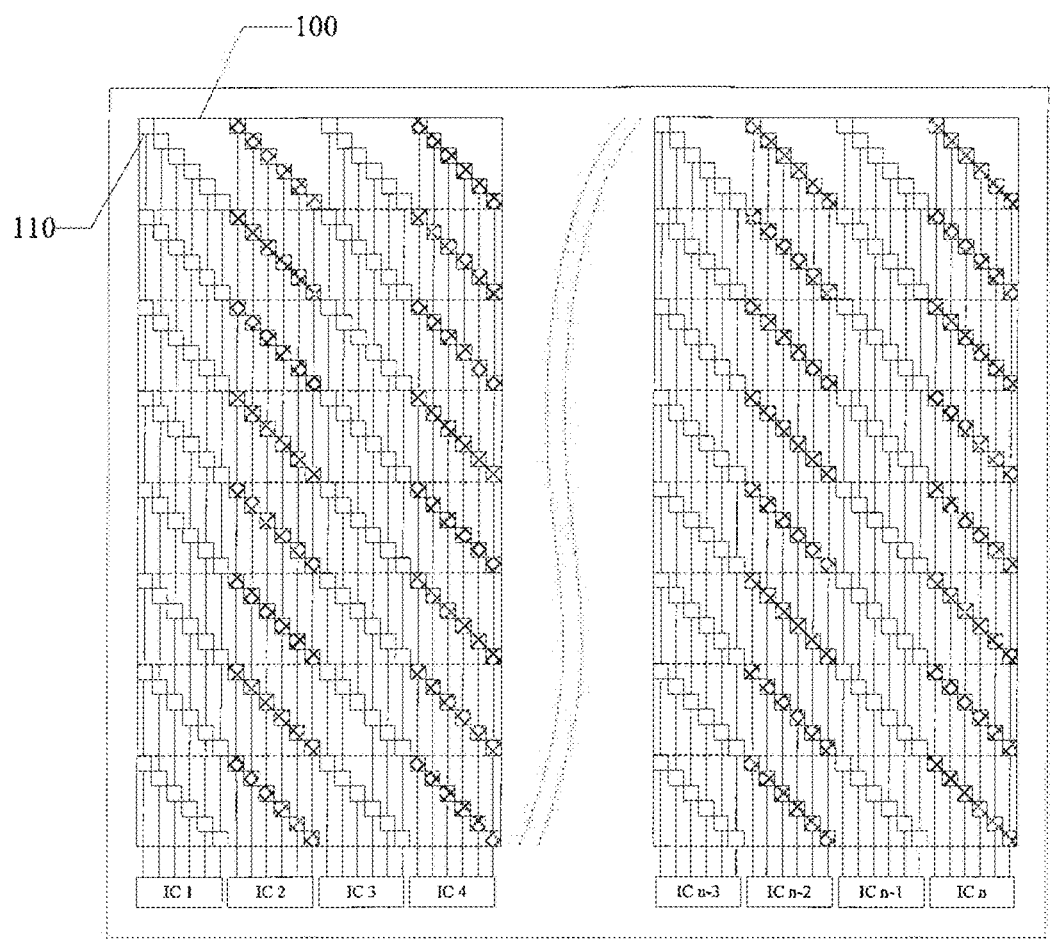

FIG. 4b is a schematic diagram illustrating a structure of a matrix of 2×2 fingerprint recognition areas 100 shown in FIG. 4a. As implemented actually, the sizes of the fingerprint recognition areas 100 and the number of the fingerprint recognition electrodes 110 included in each fingerprint recognition area 100 in the fingerprint recognition device may be set depending on actual requirements. Generally, a distance between the fingerprint recognition electrodes located at the same position in per two adjacent fingerprint recognition areas is set as 5 mm~20 mm preferably to ensure a continuity and an integrality of the image acquired by the respective fingerprint recognition areas 100. More particularly, as illustrated in FIG. 4b, a range of a distance D1 between the fingerprint recognition electrodes 1101 and 1102 located at a same position in the two fingerprint recognition areas 1001 and 1002 adjacent in a row direction is 5 mm~20 mm preferably. Likewise, a range of a distance D2 between the fingerprint recognition electrodes 1101 and 1103 located at a same position in the two fingerprint recognition areas 1001 and 1003 adjacent in a column direction is also 5 mm~20 mm preferably.

Further, in order to ensure a definition of the images acquired by the respective fingerprint recognition areas and enhance a touch sensitivity, generally a distance between centers of the adjacent fingerprint recognition electrodes in a same fingerprint recognition area may be set as 42.3 μm to 84.7 μm, and a recognition resolution of the fingerprint recognition device is 300 dpi to 600 dpi correspondingly. More particularly, as illustrated in FIG. 4b, both ranges of the distance d1 (a vertical distance) and d2 (a horizontal distance) between centers of the two adjacent fingerprint recognition electrodes 1104 and 1105 in a same fingerprint recognition area are 42.3 μm to 84.7 μm preferably.

Further, as illustrated in FIG. 4c, in order to ensure the continuity of the images acquired by the respective fingerprint recognition areas 100, the fingerprint recognition electrodes 110 in the respective fingerprint recognition areas being adjacent in a diagonal direction are arranged in a same line in the arrangement matrix of the fingerprint recognition areas 100 as implemented actually. That is, the fingerprint recognition electrodes 110 located on the diagonal lines of the fingerprint recognition areas 100 adjacent in the diagonal direction are arranged relatively continually.

As can be known from the above description, the number of the fingerprint recognition electrodes 110 included in the fingerprint recognition device according to the embodiments of the present disclosure is huge, so data processing chips (ICs) in the fingerprint recognition device would be very complex if each of the fingerprint recognition electrodes 110 in the respective fingerprint recognition areas 100 is connected to a one-to-one-corresponding data processing chip (IC) separately via a wiring(s). Therefore, as implemented actually, at least one row of the fingerprint recognition areas are controlled by a same data processing chip (IC); or at least one column of the fingerprint recognition areas are controlled by a same data processing chip (IC). For example, as illustrated in FIG. 4c, the fingerprint recognition areas in a same column are controlled by a same data processing chip (for example, IC1, IC2, IC3 . . . ICn), thus the number of the data processing chips (ICs) can be reduced and the cost is decreased. Of course, a plurality of rows or columns of the fingerprint recognition areas can also be controlled by a same data processing chip (IC), and the present disclosure is not limited thereto.

Furthermore, in order to reduce the number of wirings in the fingerprint recognition device, as implemented actually, the fingerprint recognition electrodes 110 located at a same position in the respective fingerprint recognition areas 100 being adjacent in a row direction may be electrically connected with each other, particularly be connected via the wirings, if the at least one row of the fingerprint recognition areas 100 are controlled by a same data processing chip (IC). Alternatively, the fingerprint recognition electrodes 110 located at a same position in the respective fingerprint recognition areas 100 being adjacent in a column direction may be electrically connected with each other if the at least one column of the fingerprint recognition areas 100 are controlled by a same data processing chip (IC). As illustrated in FIG. 4c, the fingerprint recognition electrodes 110 in a same column are electrically connected together via the wirings.

It should be noted that the fingerprint recognition electrodes 110 located at a same position in the respective adjacent fingerprint recognition areas 100 described above refer to: in a case where the numbers of the fingerprint recognition electrodes 110 included in the respective fingerprint recognition areas 100 are same, given that each of the fingerprint recognition areas 100 comprises n fingerprint recognition electrodes 110, and the fingerprint recognition electrodes 110 located at a same position are the $j^{th}$ fingerprint recognition electrodes in the respective fingerprint recognition areas 100, j=1, . . . , n. For example, the fingerprint recognition electrodes 1101 and 1102 in FIG. 4b are the fingerprint recognition electrodes located at a same position in the two fingerprint recognition areas 1001 and 1002 adjacent in the row direction; and the fingerprint recognition electrodes 1101 and 1103 in FIG. 4b are the fingerprint recognition electrodes located at a same position in the two fingerprint recognition areas 1001 and 1003 adjacent in the column direction.

Preferably, because a finger can slide in any direction on the fingerprint recognition device according to the embodiments of the present disclosure during usage, a frame of the fingerprint recognition electrode 110 is generally set as a square as implemented actually to ensure the full fingerprint information to be detected in any case, thus the fingerprint recognition electrodes 110 included in each fingerprint recognition area 100 are arranged in a direction at a 45° angle with respect to the frame.

An operation of the fingerprint recognition device according to the embodiments of the present disclosure would be explained hereinafter by taking a case where the fingerprint recognition electrodes 110 located at a same position in the respective fingerprint recognition areas 100 adjacent in the column direction are connected together through wirings as illustrated in FIG. 4c and one column of the fingerprint recognition electrodes 110 are controlled by a same data processing chip (IC) as an example. Here, one data processing chip may read one image. The fingerprint recognition device according to the embodiments of the present disclosure can recognize a fingerprint when a finger slides in any one of a plurality of directions.

In a First Example, a finger slides rightwards or leftwards.

When the finger slides rightwards, there may be different cases according to an initial area from which the finger starts to slide and a sliding range of the pressed fingerprint. Three cases would be explained below as examples.

Figure 5A:
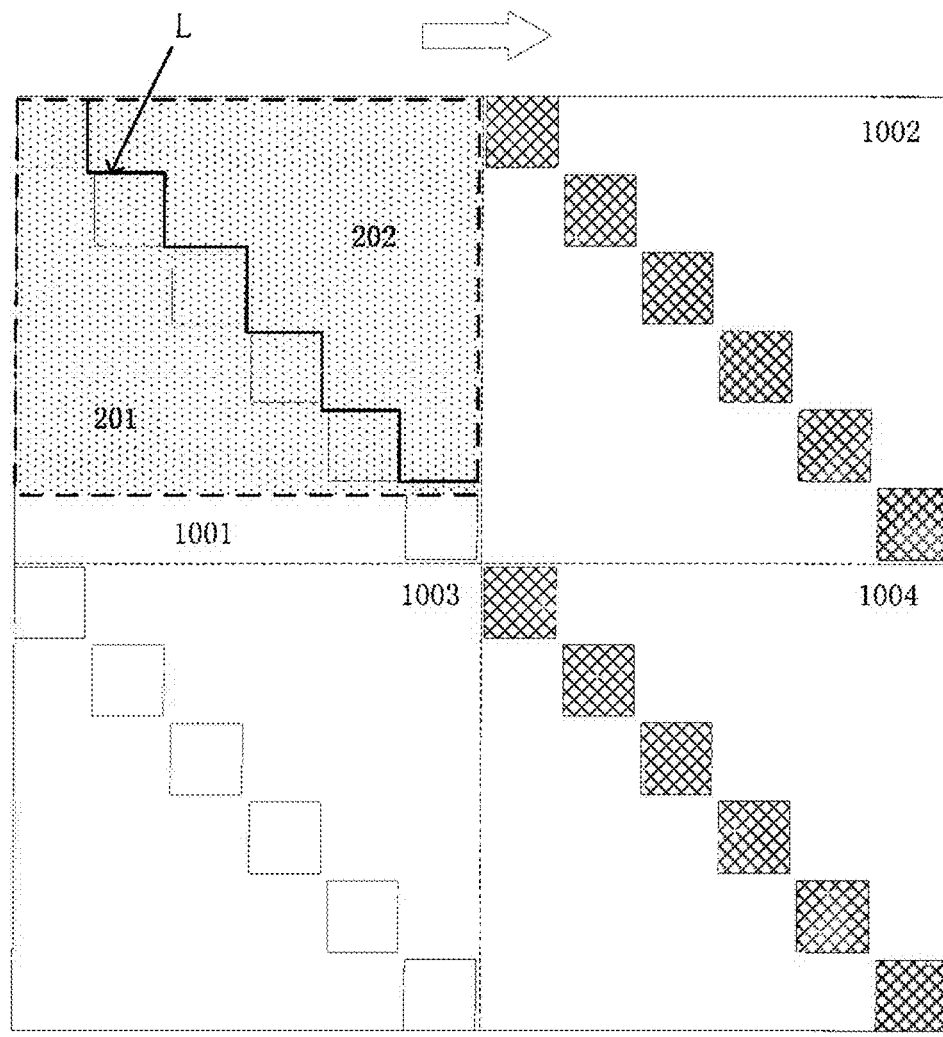
FIGS. 5a-5f are schematic diagrams illustrating a first example of the present disclosure respectively.
Figure 5B:
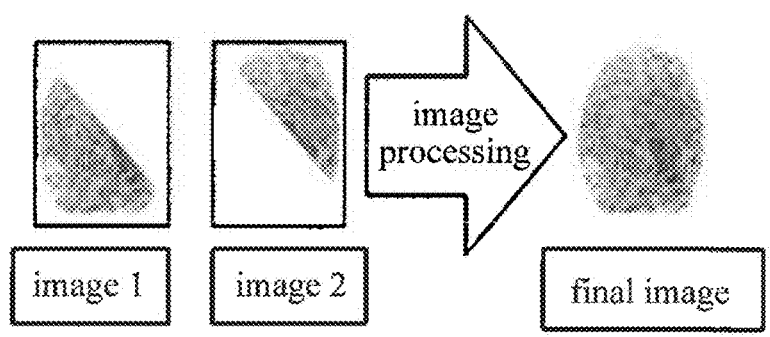

In a first case, as illustrated in FIG. 5a, an arrow denotes the sliding direction of the finger, the initial area (as denoted by a dotted box in FIG. 5a) from which the finger starts to slide covers a part of the fingerprint recognition area 1001, and the sliding range of the pressed fingerprint comprises at least part of fingerprint recognition electrodes in the two fingerprint recognition areas 1001 and 1002 adjacent left and right. Therefore, a final image is obtained by synthesizing an image 1 from the fingerprint recognition area 1001 and an image 2 from the fingerprint recognition area 1002, as illustrated in FIG. 5b. The image 1 and the image 2 correspond to images read by the data processing chips connected to the first column and the second column of the fingerprint recognition areas respectively.

More particularly, as illustrated in FIG. 5a, the initial area (the part in the dotted box) from which the finger starts to slide is divided into two parts (a bottom-left part 201 and an upper-right part 202) with a dividing line L by the fingerprint recognition electrodes in the fingerprint recognition area 1001. When the finger slides, the fingerprint information on the bottom-left part 201 is detected by the fingerprint recognition electrodes in the fingerprint recognition area 1001 and transmitted to the IC corresponding to the fingerprint recognition area 1001 (such that the image 1 in FIG. 5*b* is obtained), and the fingerprint information on the upper-right part 202 is detected by the fingerprint recognition electrodes in the fingerprint recognition area 1002 and transmitted to the IC corresponding to the fingerprint recognition area 1002 (such that the image 2 in FIG. 5*b* is obtained), and the final image as illustrated in FIG. 5*b* is then obtained by image processing.

Figure 5C:
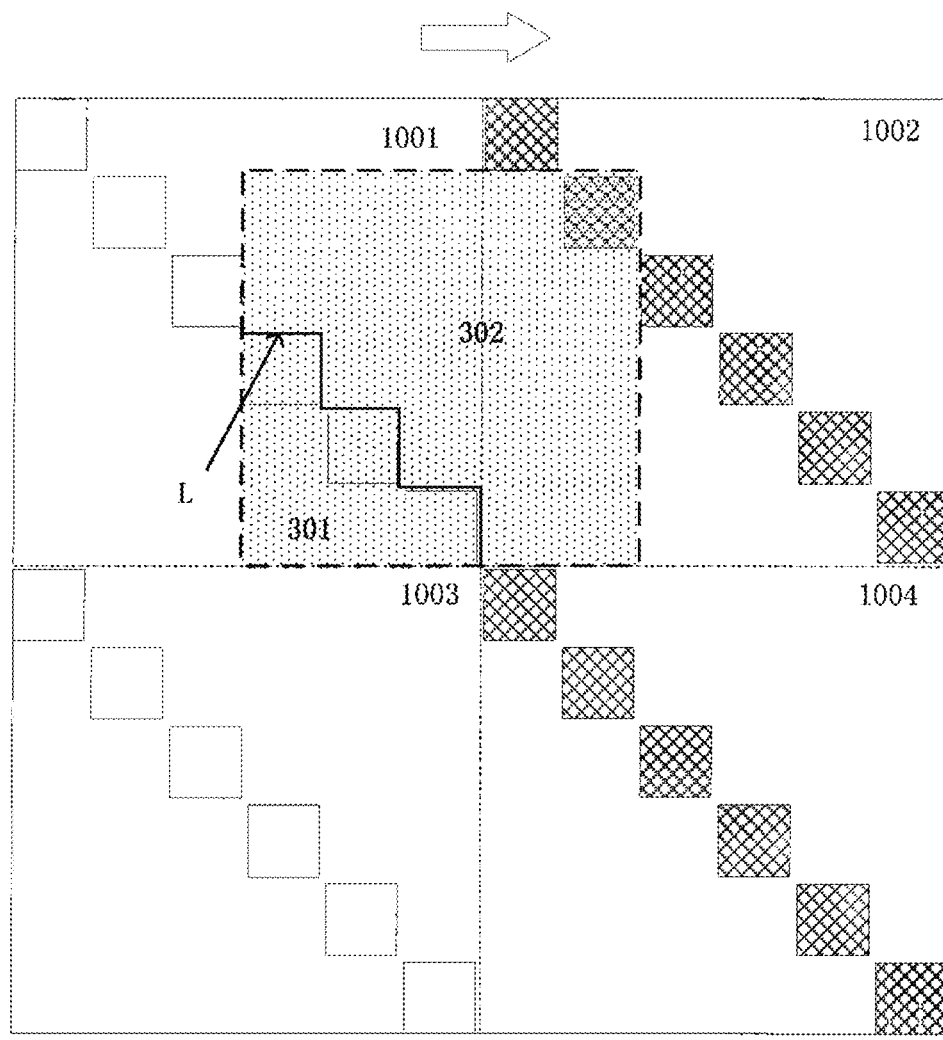
Figure 5D:
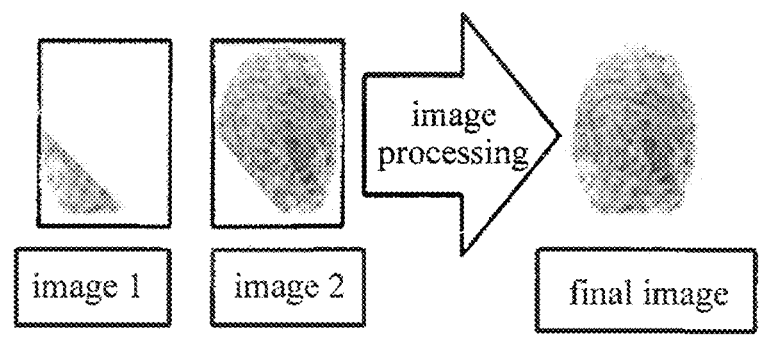

In a second case, as illustrated in FIG. 5*c*, the initial area (as denoted by a dotted box in FIG. 5*c*) from which the finger starts to slide covers a part of the fingerprint recognition areas 1001 and 1002, the sliding range of the pressed fingerprint comprises at least part of fingerprint recognition electrodes in the two fingerprint recognition areas 1001 and 1002 adjacent left and right. Therefore, a final image is obtained by synthesizing an image 1 from the fingerprint recognition area 1001 and an image 2 from the fingerprint recognition area 1002, as illustrated in FIG. 5*d*. The image 1 and the image 2 correspond to images read by the data processing chips connected to the first column and the second column of the fingerprint recognition areas respectively.

More particularly, as illustrated in FIG. 5*c*, the initial area (the part in the dotted box) from which the finger starts to slide is divided into two parts (a bottom-left part 301 and an upper-right part 302) with a dividing line L by the fingerprint recognition electrodes in the fingerprint recognition area 1001. When the finger slides, the fingerprint information on the bottom-left part 301 is detected by the fingerprint recognition electrodes in the fingerprint recognition area 1001 and transmitted to the IC corresponding to the fingerprint recognition area 1001 (such that the image 1 in FIG. 5*d* is obtained), and the fingerprint information on the upper-right part 302 is detected by the fingerprint recognition electrodes in the fingerprint recognition area 1002 and transmitted to the IC corresponding to the fingerprint recognition area 1002 (such that the image 2 in FIG. 5*d* is obtained), and the final image as illustrated in FIG. 5*d* is then obtained by image processing.

Figure 5E:
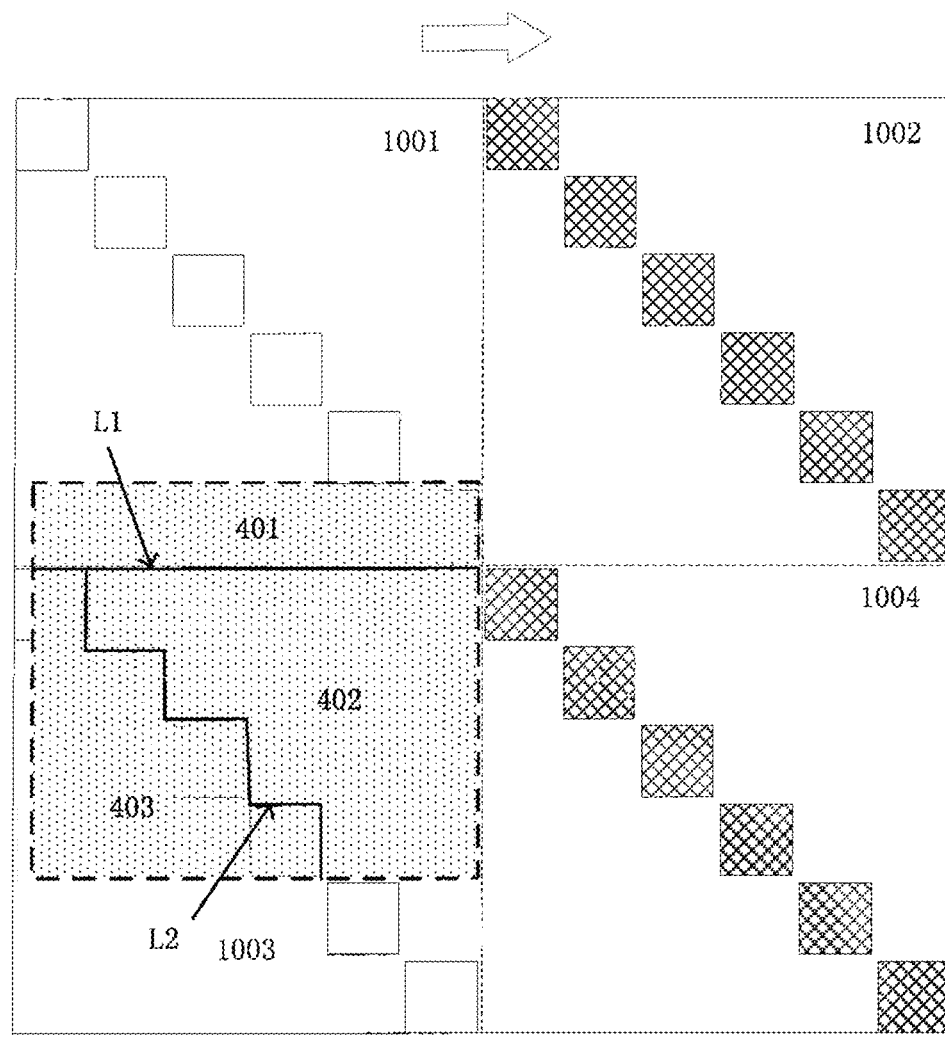

In a third case, as illustrated in FIG. 5*e*, the initial area (as denoted by a dotted box in FIG. 5*e*) from which the finger starts to slide covers a part of the fingerprint recognition area 1001 and 1003, the sliding range of the pressed fingerprint comprises at least part of fingerprint recognition electrodes in the two columns of fingerprint recognition areas (1001, 1002, 1003, 1004) adjacent left and right. Therefore, a final image is as illustrated in FIG. 5*e*. The image 1 and the image 2 correspond to images read by the data processing chips connected to the first column and the second column of the fingerprint recognition areas respectively.

More particularly, as illustrated in FIG. 5*e*, the initial area (the part in the dotted box) from which the finger starts to slide is divided into three parts, a first part 401, a second part 402 and a third part 403, with dividing lines L1 and L2 by the fingerprint recognition electrodes in the fingerprint recognition areas 1001 and 1003.

When the finger slides rightward, the fingerprint information on the first part 401 is detected by the fingerprint recognition electrodes in the fingerprint recognition area 1001 and transmitted to the IC corresponding to the fingerprint recognition area 1001, the fingerprint information on the second part 402 is detected by the fingerprint recognition electrodes in the fingerprint recognition area 1004 and transmitted to the IC corresponding to the fingerprint recognition area 1004, and the fingerprint information on the third part 403 is detected by the fingerprint recognition electrodes in the fingerprint recognition area 1003 and transmitted to the IC corresponding to the fingerprint recognition area 1003.

Figure 5F:
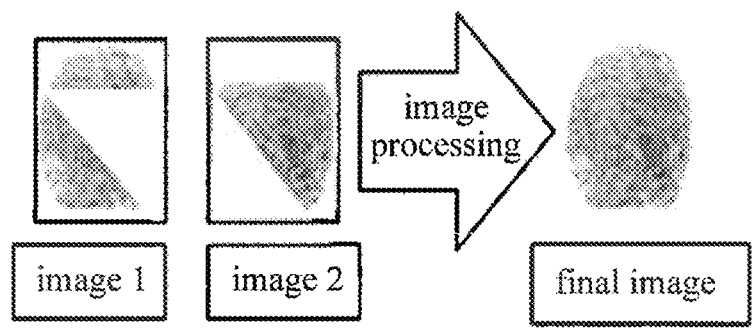

As mentioned in the embodiment corresponding to FIG. 4*c*, the fingerprint recognition areas 1001 and 1003 locate in a same column and are connected to a same IC, therefore an image obtained by synthesizing the images detected by the fingerprint recognition areas 1001 and 1003 corresponds to the image 1 in FIG. 5*f* (including the fingerprint images from the first part 401 and the third part 403). The fingerprint recognition area 1004 locates in a different column from that of the fingerprint recognition areas 1001 and 1003 and accordingly corresponds to and is connected to a different IC, therefore an image obtained by the IC corresponding to the fingerprint recognition area 1004 is the image 2 as illustrated in FIG. 5*f* (corresponding to the fingerprint image from the second part 402). A final image as illustrated in FIG. 5*f* is then obtained after the image processing is performed on the image 1 and image 2.

Likewise, a principle as the finger slides leftwards is similar to that as the finger slides rightwards, and details are not repeated herein.

In a Second Example, the finger slides downwards or upwards.

When the finger slides downwards, there may be different cases according to an initial area from which the finger starts to slide and a sliding range of the pressed fingerprint, and three cases would be explained below as examples.

Figure 6A:
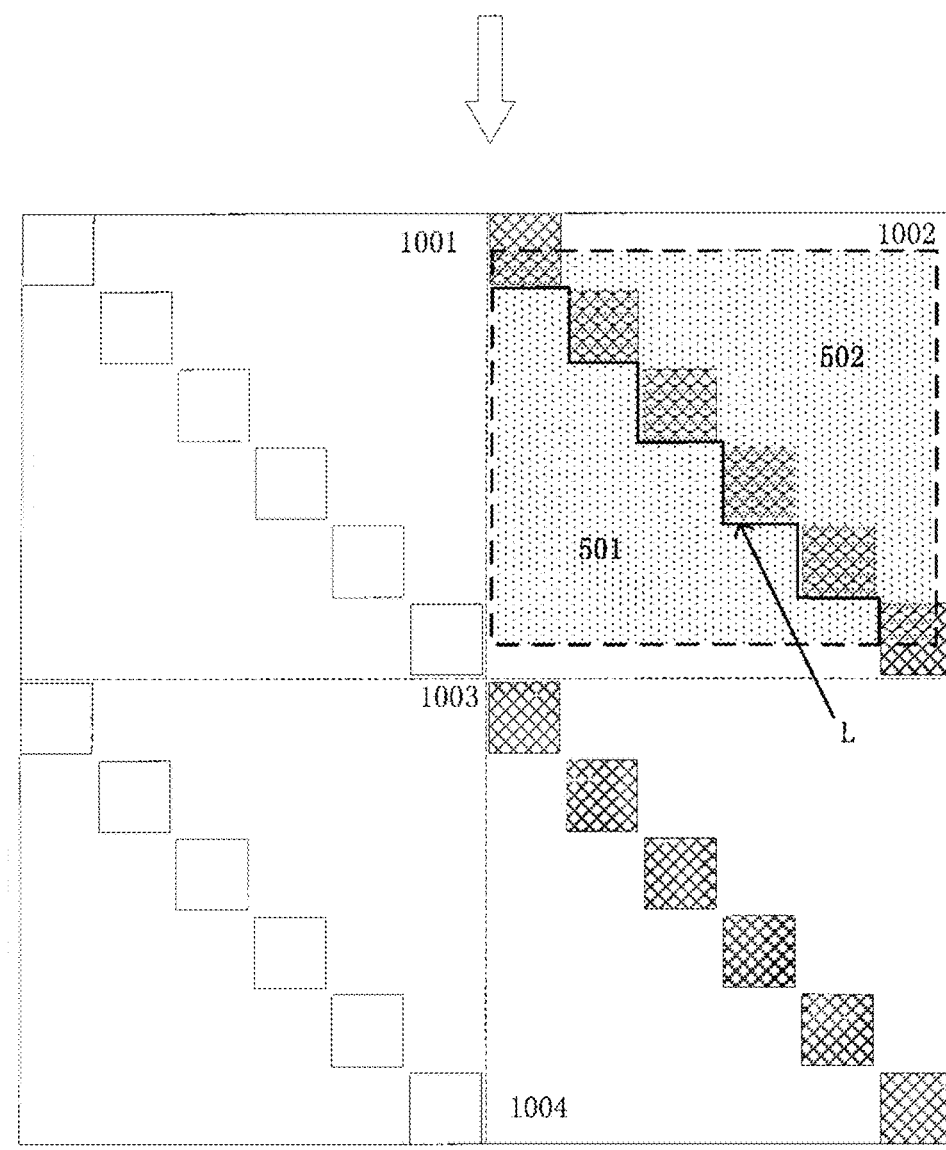
FIGS. 6a-6f are schematic diagrams illustrating a second example of the present disclosure respectively.
Figure 6B:
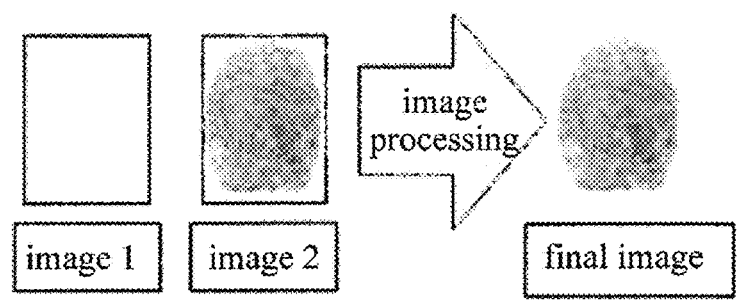

In a first case, as illustrated in FIG. 6*a*, an arrow denotes the sliding direction of the finger, the initial area (as denoted by a dotted box in FIG. 6*a*) from which the finger starts to slide covers a part of the fingerprint recognition area 1002, the sliding range of the pressed fingerprint comprises at least part of fingerprint recognition electrodes in the two fingerprint recognition areas 1002 and 1004 in a second column. Therefore, a final image is obtained by synthesizing images from the fingerprint recognition areas in the second column, as illustrated in FIG. 6*b*.

More particularly, as illustrated in FIG. 6*a*, the initial area (the part in the dotted box) from which the finger starts to slide is divided into two parts (a bottom-left part 501 and an upper-right part 502) with a dividing line L by the fingerprint recognition electrodes in the fingerprint recognition area 1002.

When the finger slides downwards, the fingerprint information on the bottom-left part 501 is detected by the fingerprint recognition electrodes in the fingerprint recognition area 1004 and transmitted to the IC corresponding to the fingerprint recognition area 1004, and the fingerprint information on the upper-right part 502 is detected by the fingerprint recognition electrodes in the fingerprint recognition area 1002 and transmitted to the IC corresponding to the fingerprint recognition area 1002. As mentioned in the embodiment described in connection with FIG. 4*c*, the fingerprint recognition areas 1002 and 1004 locate in a same column and accordingly are connected to a same IC, so an image obtained by synthesizing the images from the two fingerprint recognition areas 1002 and 1004 corresponds to an image 1 (including the fingerprint images from the bottom-left part 501 and the upper-right part 502), and the final image is as illustrated in FIG. 6*b*.

Figure 6C:
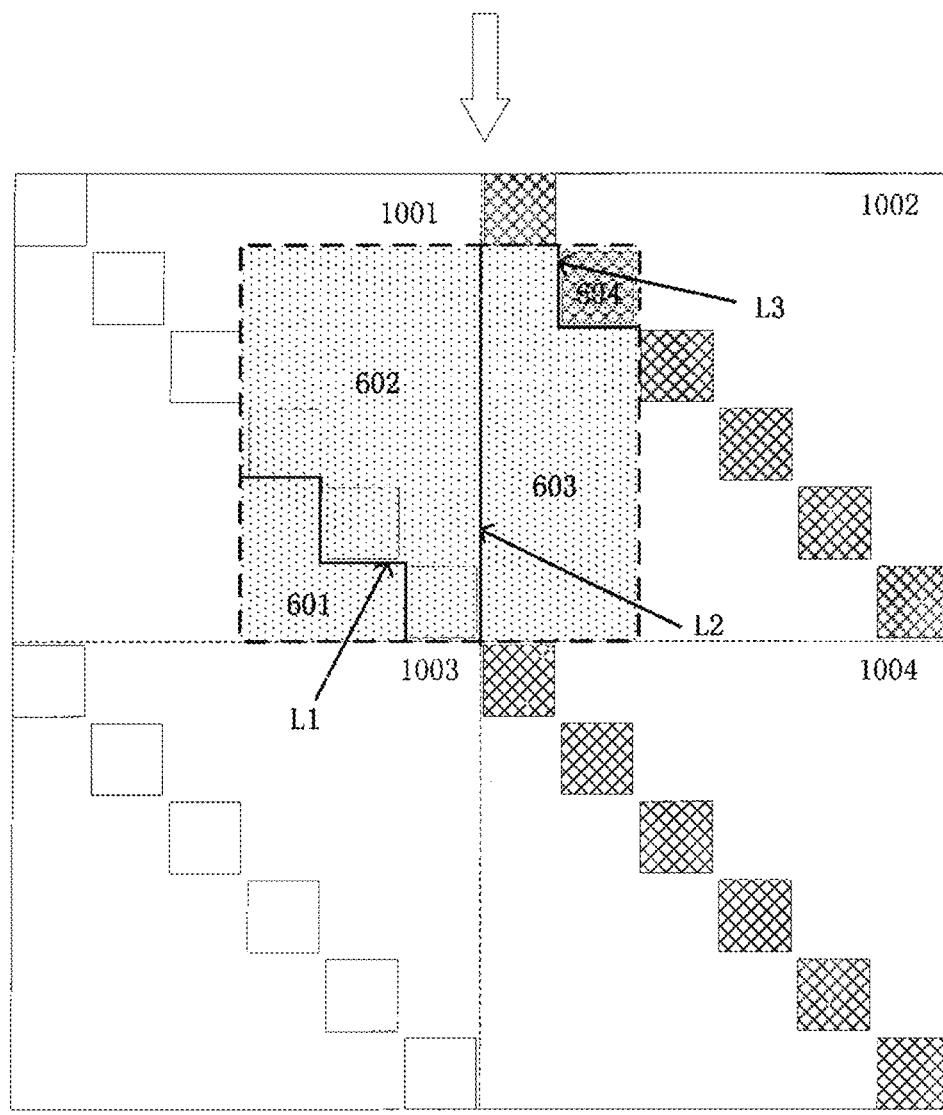
Figure 6D:
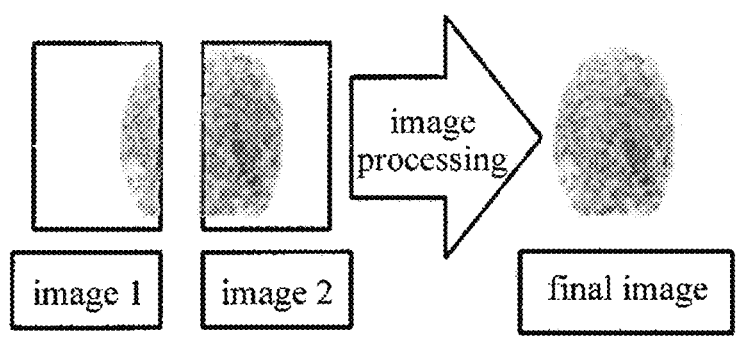

In a second case, as illustrated in FIG. 6*c*, the initial area (as denoted by dotted box in FIG. 6*c*) from which the finger starts to slide covers a part of the fingerprint recognition areas 1001 and 1002, the sliding range of the pressed fingerprint comprises at least part of fingerprint recognition electrodes in two columns of fingerprint recognition areas (1001, 1002, 1003 and 1004) adjacent left and right. Therefore, a final image is as illustrated in FIG. 6*d*. An image 1 and an image 2 correspond to images read by the first column and the second column of the fingerprint recognition areas respectively.

More particularly, as illustrated in FIG. 6*c*, the initial area (the part in the dotted box) from which the finger starts to slide is divided into four parts, namely a first part 601, a second part 602, a third part 603 and a fourth part 604, with dividing lines L1, L2, L3 by the fingerprint recognition electrodes in the fingerprint recognition areas 1001 and 1002.

When the finger slides downwards, the fingerprint information on the first part 601 is detected by the fingerprint recognition electrodes in the fingerprint recognition area 1003 and transmitted to the IC corresponding to the fingerprint recognition area 1003, the fingerprint information on the second part 602 is detected by the fingerprint recognition electrodes in the fingerprint recognition area 1001 and transmitted to the IC corresponding to the fingerprint recognition area 1001. As mentioned in the embodiment described in connection with FIG. 4*c*, the fingerprint recognition areas 1001 and 1003 locate in a same column and accordingly are connected to a same IC, so an image obtained by synthesizing the images from the two fingerprint recognition areas 1001 and 1003 corresponds to an image 1 (that is, synthesis of the fingerprint images from the second part 602 and the first part 601) in FIG. 6*d*.

Further, the fingerprint information on the third part 603 is detected by the fingerprint recognition electrodes in the fingerprint recognition area 1004 and transmitted to the IC corresponding to the fingerprint recognition area 1004, the fingerprint information on the fourth part 604 is detected by the fingerprint recognition electrodes in the fingerprint recognition area 1002 and transmitted to the IC corresponding to the fingerprint recognition area 1002. Herein the fingerprint recognition areas 1002 and 1004 locate in a same column and accordingly are connected to a same IC, so an image obtained by synthesizing the images from the two fingerprint recognition areas 1002 and 1004 corresponds to an image 2 in FIG. 6*d* (that is, synthesis of the fingerprint images from the fourth part 604 and the third part 603 in FIG. 6*c*). The final image as illustrated in FIG. 6*d* is then obtained after the image processing is performed on the image 1 and image 2 in FIG. 6*c*.

Figure 6E:
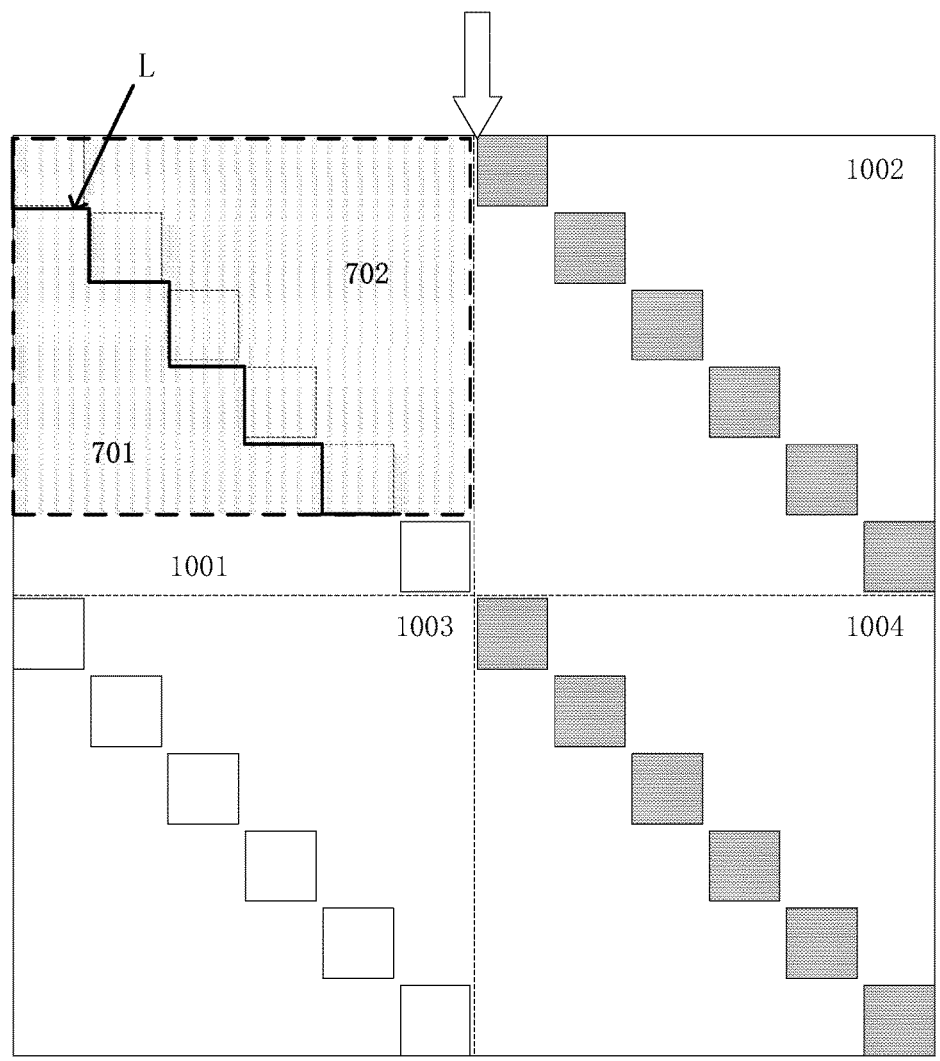

In a third case, as illustrated in FIG. 6*e*, an arrow denotes the sliding direction of the finger, the initial area (as denoted by a dotted box in FIG. 6*e*) from which the finger starts to slide covers a part of the fingerprint recognition area 1001, the sliding range of the pressed fingerprint comprises at least part of fingerprint recognition electrodes in the two fingerprint recognition areas 1001 and 1003 in a first column. Therefore, a final image is as illustrated in FIG. 6*e*, which is obtained by synthesizing the images from the fingerprint recognition areas in the first column.

More particularly, as illustrated in FIG. 6*e*, the initial area (the part in the dotted box) from which the finger starts to slide is divided into two parts (a bottom-left part 701 and a upper-right part 702) with a dividing line L by the fingerprint recognition electrodes in the fingerprint recognition area 1001.

When the finger slides downwards, the fingerprint information on the bottom-left part 701 is detected by the fingerprint recognition electrodes in the fingerprint recognition area 1003 and transmitted to the IC corresponding to the fingerprint recognition area 1003, the fingerprint information on the upper-right part 702 is detected by the fingerprint recognition electrodes in the fingerprint recognition area 1001 and transmitted to the IC corresponding to the fingerprint recognition area 1001.

Figure 6F:
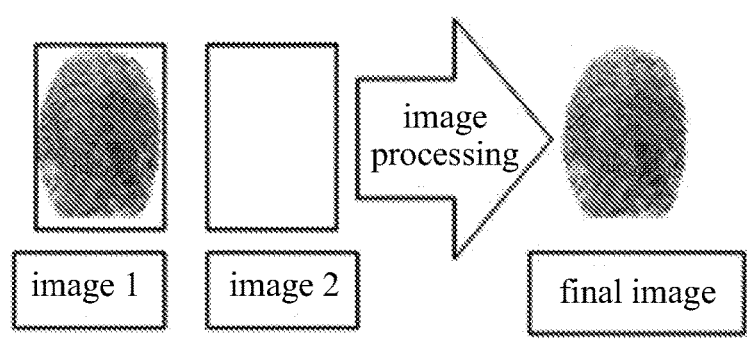

As mentioned in the embodiment described in connection with FIG. 4*c*, the fingerprint recognition area 1001 and 1003 locate in a same column and accordingly are connected to the same IC, so an image obtained by synthesizing the images from the they two corresponds to an image 1 (including the fingerprint images from the bottom-left part 701 and the upper-right part 702) in FIG. 6*f*. Since the areas in the second column (comprising the fingerprint recognition areas 1002 and 1004) are not covered when the finger slides downwards, so the IC corresponds to the second column detects no image, the obtained final image shown in FIG. 6*f* only comprises the fingerprint image being the image 1.

Likewise, a principle as the finger slides upwards is similar to that as the finger slides downwards, and details are not repeated herein.

In a Third Example: the finger slides obliquely.

Figure 7A:
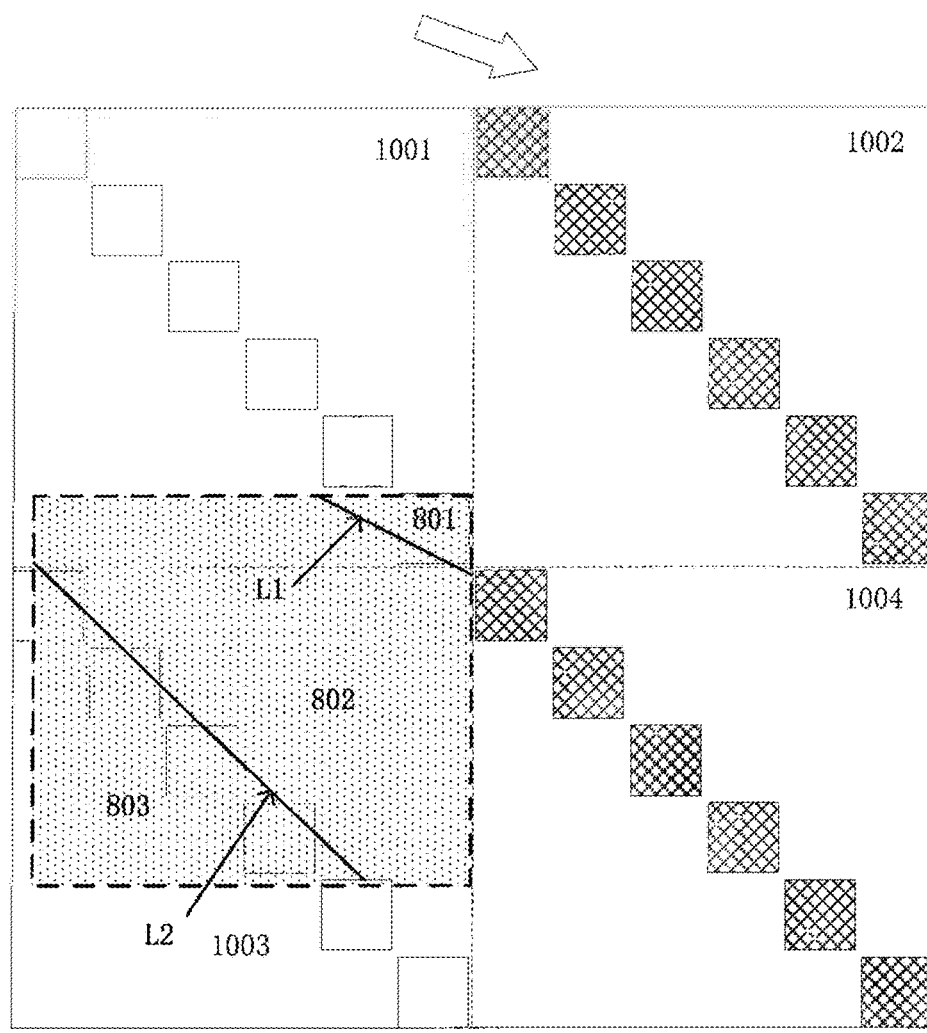
FIGS. 7a and 7b are schematic diagrams illustrating a third example of the present disclosure respectively.
Figure 7B:
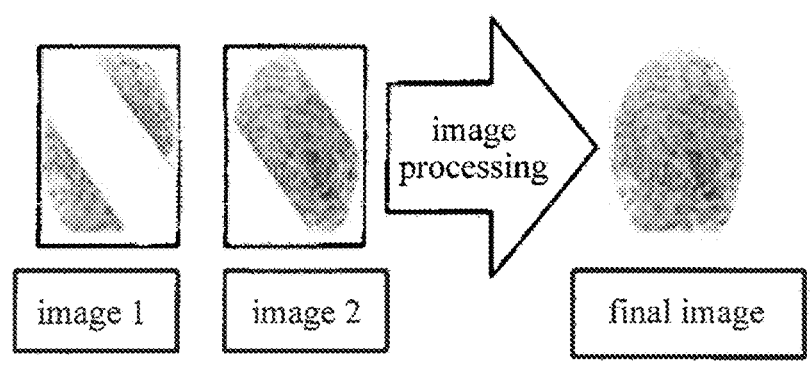

When the finger slides down obliquely, its sliding direction is not identical with the arrangement direction of the fingerprint recognition electrodes 110, namely the diagonal direction of the fingerprint recognition areas 100, as illustrated in FIG. 7*a*, the initial area from which the finger starts to slide covers a part of the fingerprint recognition areas 1001 and 1003, and the sliding range of the pressed fingerprint comprises at least part of fingerprint recognition electrodes in the two columns of fingerprint recognition areas (1001, 1002, 1003 and 1004) adjacent left and right. Therefore, a final image is as illustrated in FIG. 7*b*. An image 1 and an image 2 correspond to images read by the first column and second column of the fingerprint recognition areas respectively.

More particularly, as illustrated in FIG. 7*a*, the initial area (the part in a dotted box) from which the finger starts to slide is divided into three parts, namely a first part 801, a second part 802 and a third part 803, with dividing lines L1 and L2, by the fingerprint recognition electrodes in the fingerprint recognition areas 1001 and 1003.

When the finger slides obliquely, the fingerprint information on the first part 801 is detected by the fingerprint recognition electrodes in the fingerprint recognition area 1001 and transmitted to the IC corresponding to the fingerprint recognition area 1001, the fingerprint information on the second part 802 is detected by the fingerprint recognition electrodes in the fingerprint recognition area 1004 and transmitted to the IC corresponding to the fingerprint recognition area 1004, and the fingerprint information on the third part 803 is detected by the fingerprint recognition electrodes in the fingerprint recognition area 1003 and transmitted to the IC corresponding to the fingerprint recognition area 1003.

As illustrated in FIG. 4*c*, the fingerprint recognition areas 1001 and 1003 locate in a same column and accordingly are connected to a same IC, so an image obtained by synthesizing the images detected by these two corresponds to an image 1 (comprising the fingerprint images of the first part 801 and the third part 803) in FIG. 7*b*. Further, the fingerprint recognition area 1004 locates in a different column from the fingerprint recognition areas 1001 and 1003 and accordingly corresponds to and is connected to a different IC, therefore an image obtained by the IC corresponding to the fingerprint recognition area 1004 corresponds to an image 2 (corresponding to the fingerprint image of the second part 802) shown in FIG. 7b. A final image as illustrated in FIG. 7b is then obtained after data processing is performed on the image 1 and image 2.

From the three examples described above, it can be seen that the full fingerprint information can be synthesized based on the images from the fingerprint recognition electrodes in the fingerprint recognition areas 100 belonging to a same or adjacent column(s) covered in the sliding range of the pressed fingerprint when the finger slides in any one of several directions, so that the fingerprint can be recognized. Therefore, the sliding type fingerprint recognition device is not restricted by the sliding direction of the finger, and thus an application scope of the sliding type fingerprint recognition device can be expanded.

Based on the same inventive concept, the embodiments of the present disclosure further provide a touch apparatus comprising the fingerprint recognition device described above. Because the principle for the touch apparatus to settle the problem is as same as that for the fingerprint recognition device, implementations of the touch apparatus may be referred to those of the fingerprint recognition device, and details would be not be repeated herein. The touch apparatus may be a mobile phone, a tablet computer, a TV, a display, a notebook computer, a digital photo frame, a navigator and any other product or part with a touch function.

Figure 8:
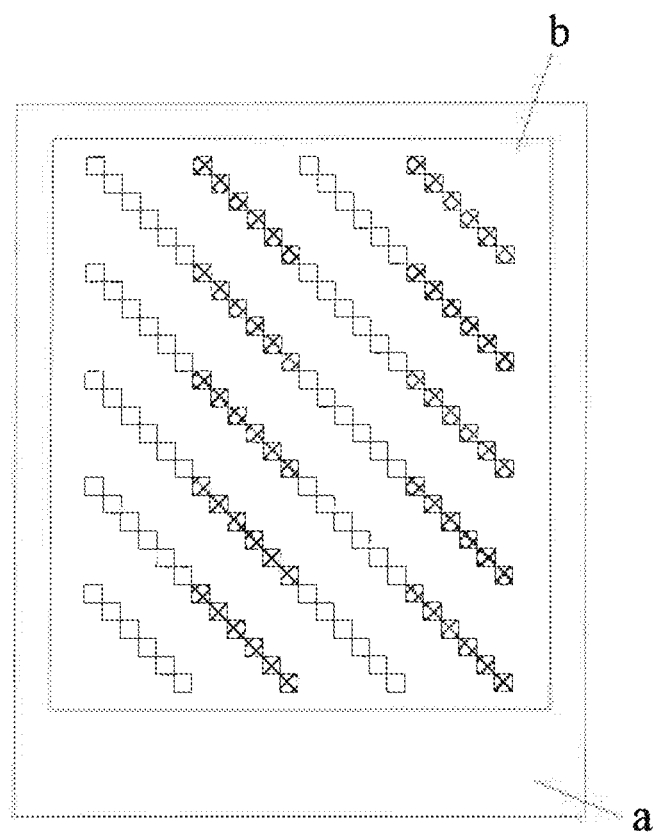
FIG. 8 is a schematic diagram illustrating a structure of a touch apparatus according to the embodiments of the present disclosure.

Particularly, the touch apparatus according to the embodiments of the present disclosure comprises a peripheral region a and a display region b having a plurality of fingerprint recognition electrodes arranged in a matrix; and the fingerprint recognition device according to the embodiments of the present disclosure locates within the display region b comprising the fingerprint recognition electrodes, as illustrated in FIG. 8.

The touch apparatus according to the embodiments of the present disclosure may be an in-cell touch panel or an out-cell touch panel, or any other suitable touch panel, and the present disclosure is not limited thereto.

The touch apparatus according to the embodiments of the present disclosure can detect the fingerprint even the finger slides in any one of several directions while realizing a touch display function.

As implemented actually, the above fingerprint recognition device according to the embodiments of the present disclosure may locate inside the touch apparatus or also may locate at a surface of the touch apparatus on a side from which light is emitted.

Figure 9:
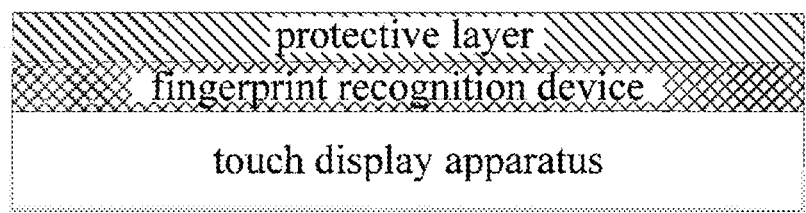
FIG. 9 is a side view of the touch apparatus according to the embodiments of the present disclosure.

More particularly, in the embodiments of the present disclosure, in order to prevent the fingerprint recognition electrodes from being exposed and harmed, which may lead to failures in touch, a protective layer may be further disposed on the fingerprint recognition electrodes. As illustrated in FIG. 9, if the fingerprint recognition device according to the embodiments of the present disclosure locates at the surface of the touch apparatus on a side from which light is emitted, the protective layer is further required to be disposed on the fingerprint recognition device besides traditional films such as antireflection film (not shown in FIG. 9), etc, on the surface of the fingerprint recognition device, in order to prevent the fingerprint recognition electrodes from being scratched in use. For example, the protective layer may be a transport protective layer such as SiN or SiO, with a thickness not bigger than 20 µm generally and preferably.

The fingerprint recognition device and the touch apparatus according to the embodiments of the present disclosure comprise a plurality of fingerprint recognition areas with the rectangle shape arranged in the matrix, each of the fingerprint recognition areas comprises the plurality of mutually independent fingerprint recognition electrodes arranged along the diagonal direction of the fingerprint recognition areas, the arrangement directions of the fingerprint recognition electrodes in the respective fingerprint recognition areas are same. Because the fingerprint recognition electrodes in the respective fingerprint recognition areas are arranged in the same diagonal direction, the fingerprint recognition electrodes belonging to the same or adjacent fingerprint recognition areas can detect full fingerprint information when a finger slides on the fingerprint recognition device in any one of a plurality of directions, so that the fingerprint is recognized. Therefore, the sliding type fingerprint recognition device is not restricted by the sliding direction of the finger, and thus an application scope of the sliding type fingerprint recognition device can be expanded. Further, a full fingerprint can be detected without long distance sliding of the finger, and thus a sensitivity of the sliding type fingerprint recognition is increased. As compared with the pressing type fingerprint recognition device, the sliding type fingerprint recognition device according to the embodiments of the present disclosure can detect a full fingerprint image with less fingerprint recognition electrodes and is benefit for reduce of the cost.

Obviously, those skilled in the art may make various modifications and variations on the present disclosure without departing from the spirit and scope of the present disclosure. Thus, the present disclosure is intended to cover the modifications and variations to the present disclosure if such modifications and variations belong to the scope defined by the claims of the present disclosure and equivalence thereof.

This application claims priority to a Chinese Patent Application No. CN 201510025632.8, filed on Jan. 19, 2015, titled as "fingerprint recognition device and touch apparatus", in the Chinese State Intellectual Property Office, the disclosure of which is incorporated by reference herein in entirety.

What is claimed is:

1. A sliding type fingerprint recognition device, comprising: a plurality of fingerprint recognition areas with a rectangle shape arranged in a matrix, each of the fingerprint recognition areas comprising a plurality of mutually independent fingerprint recognition electrodes arranged as a single diagonal array of electrodes within the fingerprint recognition area; wherein arrangement directions of the fingerprint recognition electrodes in the respective fingerprint recognition areas are same.

2. The sliding type fingerprint recognition device of claim 1, wherein at least one row of the fingerprint recognition areas are controlled by a same data processing chip; or
   at least one column of the fingerprint recognition areas are controlled by a same data processing chip.

3. The sliding type fingerprint recognition device of claim 2, wherein numbers of the fingerprint recognition electrodes in the respective fingerprint recognition areas are same.

4. The sliding type fingerprint recognition device of claim 3, wherein
   the fingerprint recognition electrodes located at a same position in the respective fingerprint recognition areas being adjacent in a row direction are electrically connected with each other if at least one row of the fingerprint recognition areas are controlled by a same data processing chip; and
   the fingerprint recognition electrodes located at a same position in the respective fingerprint recognition areas being adjacent in a column direction are electrically connected with each other if at least one column of the fingerprint recognition areas are controlled by a same data processing chip.

5. The sliding type fingerprint recognition device of claim 3, wherein a distance between the fingerprint recognition electrodes located at a same position in per two adjacent fingerprint recognition areas is 5 mm~20 mm.

6. The sliding type fingerprint recognition device of claim 1, wherein in the fingerprint recognition areas arranged in the matrix, the fingerprint recognition electrodes in the respective fingerprint recognition areas being adjacent in a diagonal direction are arranged in a same line.

7. The sliding type fingerprint recognition device of claim 1, wherein the fingerprint recognition electrodes included in each of the fingerprint recognition areas are arranged in a direction at a 45° angle with respect to a frame of the fingerprint recognition area.

8. The sliding type fingerprint recognition device of claim 1, wherein a distance between centers of the adjacent fingerprint recognition electrodes in a same fingerprint recognition area is 42.3 µm to 84.7 µm.

9. A touch apparatus, comprising the sliding type fingerprint recognition device of claim 1.

10. The touch apparatus of claim 9, wherein a protective layer is further disposed on the sliding type fingerprint recognition device.

11. The sliding type touch apparatus of claim 9, wherein
at least one row of the fingerprint recognition areas are controlled by a same data processing chip; or
at least one column of the fingerprint recognition areas are controlled by a same data processing chip.

12. The sliding type touch apparatus of claim 11, wherein numbers of the fingerprint recognition electrodes in the respective fingerprint recognition areas are same.

13. The sliding type touch apparatus of claim 12, wherein
the fingerprint recognition electrodes located at a same position in the respective fingerprint recognition areas being adjacent in a row direction are electrically connected with each other if at least one row of the fingerprint recognition areas are controlled by a same data processing chip; and
the fingerprint recognition electrodes located at a same position in the respective fingerprint recognition areas being adjacent in a column direction are electrically connected with each other if at least one column of the fingerprint recognition areas are controlled by a same data processing chip.

14. The sliding type touch apparatus of claim 12, wherein a distance between the fingerprint recognition electrodes located at a same position in per two adjacent fingerprint recognition areas is 5 mm~20 mm.

15. The sliding type touch apparatus of claim 9, wherein in the fingerprint recognition areas arranged in the matrix, the fingerprint recognition electrodes in the respective fingerprint recognition areas being adjacent in a diagonal direction are arranged in a same line.

16. The sliding type touch apparatus of claim 9, wherein the fingerprint recognition electrodes included in each of the fingerprint recognition areas are arranged in a direction at a 45° angle with respect to a frame of the fingerprint recognition area.

17. The sliding type touch apparatus of claim 9, wherein a distance between centers of the adjacent fingerprint recognition electrodes in a same fingerprint recognition area is 42.3 µm to 84.7 µm.

\* \* \* \* \*